E. LEMAIRE.
ELECTRIC ACCUMULATOR.
APPLICATION FILED JUNE 9, 1919.
1,366,010.
Patented Jan. 18, 1921.
3 SHEETS—SHEET 1.
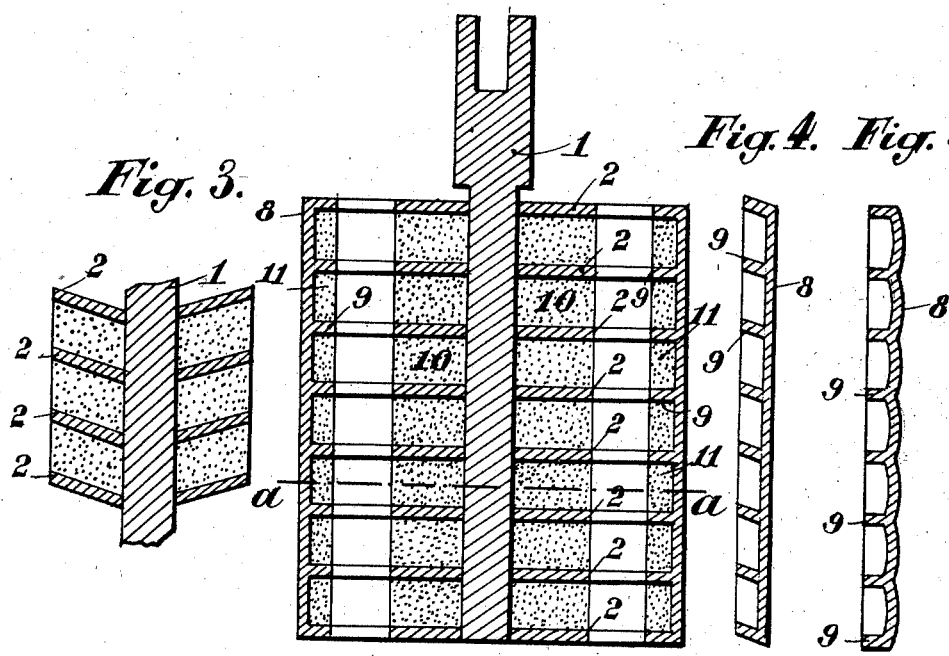
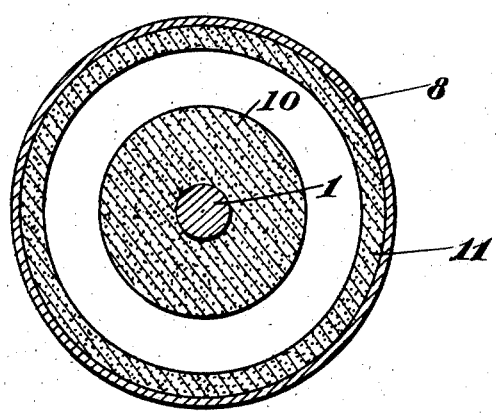

E. LEMAIRE.
ELECTRIC ACCUMULATOR.
APPLICATION FILED JUNE 9, 1919.

1,366,010.

Patented Jan. 18, 1921.
3 SHEETS—SHEET 2.

E. LEMAIRE.
ELECTRIC ACCUMULATOR.
APPLICATION FILED JUNE 9, 1919.

1,366,010.

Patented Jan. 18, 1921.
3 SHEETS—SHEET 3.

Inventor
Emmanuel Lemaire

UNITED STATES PATENT OFFICE.

EMMANUEL LEMAIRE, OF MONS, BELGIUM.

ELECTRIC ACCUMULATOR.

1,366,010.　　　　　Specification of Letters Patent.　　Patented Jan. 18, 1921.

Application filed June 9, 1919. Serial No. 302,958.

*To all whom it may concern:*

Be it known that I, EMMANUEL LEMAIRE, a subject of the King of Belgium, residing at 116 Boulevard Sainctelette, Mons, Belgium, have invented certain new and useful Improvemenets in Electric Accumulators, of which the following is a specification.

This invention has for its object an accumulator with related oxides, which allows a high capacity with a small volume to be obtained and the buckling and rupture of the plates to be avoided as well as the detachment of the active materials to be avoided, which insures to it a long life.

This accumulator which may be made of all dimensions and for all uses, is particularly adapted for use with miners' lamps.

The electrodes of this accumulator are arranged concentrically and at a distance from each other. The positive electrode is in the form of a solid cylinder and its metal armature is composed of a central rod which carries horizontal circular plates separated by spaces from each other. The negative electrode is in the form of a hollow cylinder and its metal armature is composed of an outer cylindrical jacket of solid sheet metal carrying on its interior annular horizontal plates separated by spaces from each other.

The spaces which exist between the various plates of the two armatures are filled up by the active materials which are retained in place by multiple walled divisions composed of permeable elements adapted to retain even the finest particles of the active materials. The tank of the accumulator may be of any kind. It may in particular be formed by the outer jacket of the negative electrode. Contrary to the accumulators already known, in which it is sought to develop the surfaces of the active materials, the accumulator which forms the subject matter of this invention is based upon the principle that as good results are obtained by augmenting the thickness of the active material. The forms adopted are for the purpose of storing the maximum amount of active material on the minimum amount of surface. Thicknesses of ten centimeters and more of active materials may be attained which has never yet been secured up to the present in any accumulator.

The accompanying drawings represent, by way of example, accumulators constructed according to this invention :—

Figure 1 is a central vertical section, and

Fig. 2 a horizontal section on the line *a—a* of Fig. 1 taken through the armatures charged with the active materials of the electrodes of an accumulator.

Figs. 3, 4 and 5 show in vertical section armatures of modified form.

Figure 6:
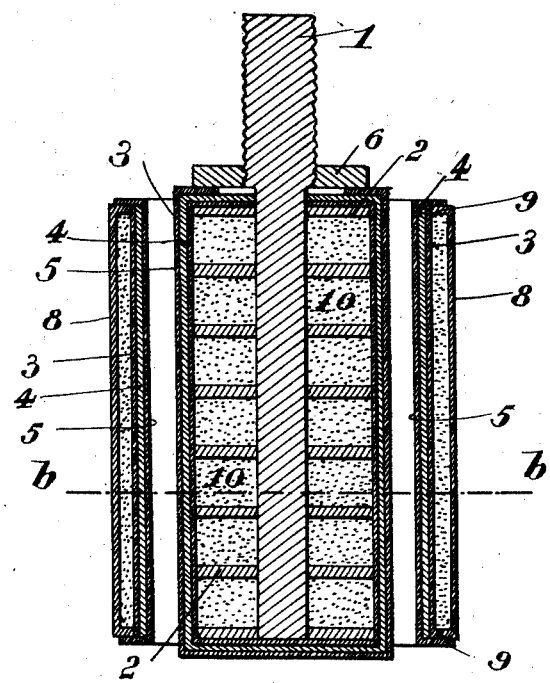
Fig. 6 is a central vertical section.
Figure 7:
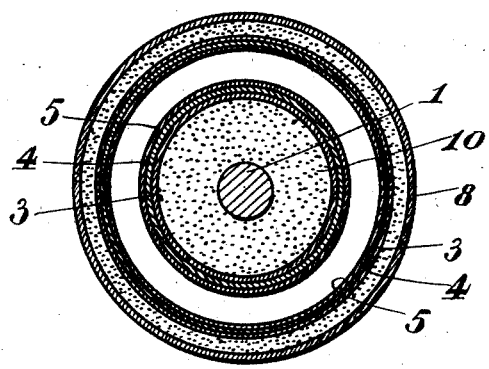

Fig. 7 a horizontal section on the line *b—b* of Fig. 6, taken through the electrodes of an accumulator provided with their protecting divisions.

Figure 8:
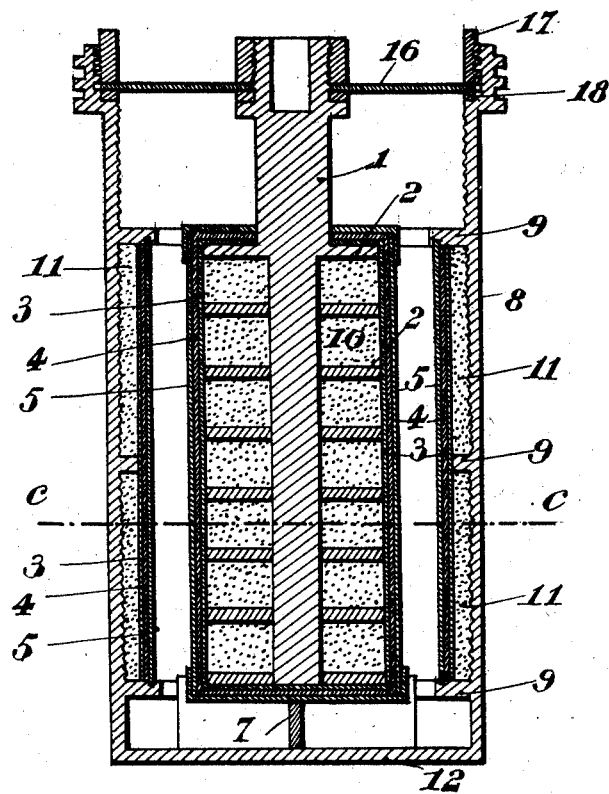

Fig. 8 is a central vertical section, and

Figure 9:
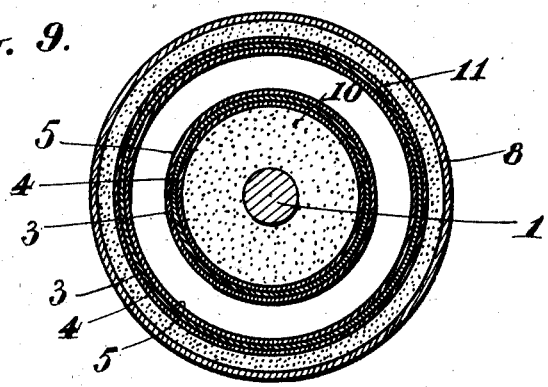

Fig. 9 a horizontal section on the line C—C of Fig. 8, taken through an accumulator of the portable type the box of which is constituted by the outer jacket of the negative electrode.

The same reference numbers indicate like parts in all these figures.

1 is the central rod of the metal armature of the positive electrode. Upon this rod, cast in one therewith or fixed by autogenous soldering, screwing or otherwise are circular plates 2 which may be horizontal (see Fig. 1) or inclined downward toward the central rod (see Fig. 3).

8 is the outer cylindrical jacket of the negative electrode carrying internally annular horizontal plates 9 (see Fig. 1) or inclined downward toward the jacket (see Fig. 4) cast in one therewith or fixed by soldering, screwing or otherwise to the jacket 8. The walls of the jacket 8 may be straight (see Figs. 1 and 4) or corrugated (see Fig. 5) and this jacket may be hollowed out or formed with a solid bottom 12 (see Fig. 8) and extended upward and downward beyond the upper and lower plates so as to constitute the tank of the accumulator. In this case the positive electrode is insulated from the metal bottom by a support of ebonite or celluloid or by any other means. The spaces between the plates of each armature are filled up with the active materials 10, 11, which, for the positive electrode, may be formed of red lead with or without litharge and, for the negative electrode, of litharge, these materials being agglomerated by known methods. These materials may be constituted likewise by the oxids of nickel or of other peroxidizable metals.

The plates 2 and 9 of the armatures instead of being flat may be corrugated, grooved or perforated and provided with ledges, hollows or projections. These plates or certain of them may be made of a non-metallic material.

The central rod 1 may be hollow or solid and provided or not with vertical wings.

The intermediate plates 9 of the negative electrode may be dispensed with as is shown in Fig. 6. In Fig. 8 only one of these plates is retained.

The cylindrical divisions, which keep the active materials of the two electrodes in place, are formed by a triple wall.

The inner wall 3 is made of any suitable permeable material such as a fabric or felt of asbestos, glass, bamboo fiber or other substance which resists the action of acids.

This wall is covered with a second wall 4 constituted preferably of a sheet of wood veneer or cork, about half a millimeter in thickness, coated or not with a solution of caoutchouc which leaves upon the sheet a very thin film of the caoutchouc which assists its preservation in the acid without hindering the passage of the current or of gases.

This second wall is kept in place by an outer wall 5 which is perforated and composed preferably of lead, ebonite, celluloid or wood.

That which constitutes a characteristic of the invention is the combination of these three walls and especially the interposition between the walls 3 and 5 of a sheet of wood veneer or cork for the purpose of keeping back the finest particles of the active materials. The three walls form a whole which efficiently resists acids, hindering all detachment of the active materials, which are kept well in place and of long duration.

The triple division 3, 4, 5 extends beneath the positive electrode so as to form a bottom (see Fig. 6). It also covers the upper plate and is secured in place by a nut 6 (see Fig. 6) preferably of ebonite or celluloid, screwed on to the screw-threaded central rod of the positive metal armature. The bottoms of the outer wall 5 may also be formed by covers screwed on to its cylindrical part (see Fig. 8).

In the negative electrode, the two ends of the outer jacket 5 are attached to the extreme annular plates of the metal armature either by soldering, screwing, being fitted into a groove in the plates (see Fig. 8) or in any other suitable manner. The metal armature of the negative electrode and the outer wall of its division may be made of lead, copper or its alloys, of chromium or its alloys, of aluminium or its alloys of cadmium or of any other metal not capable of being attacked by acids or capable of giving a metallic deposit by electrolysis or furthermore of a metal covered with any kind of protecting covering.

It is obvious that the positive electrode may be constructed as the negative electrode and vice versa and a polygonal form given to the electrodes in place of the circular form.

As has been stated, the outer jacket of the negative electrode may be utilized to form thereof the tank or box of the accumulator. For portable accumulators, this box is made of rigid metal, and closed at top by a flat cover 16 (see Fig. 8) of celluloid or ebonite screwed on to the box or held in place by a nut 17 with the interposition of a caoutchouc joint 18.

What I claim and desire to secure by Letters Patent of the United States is:—

1. The combination in an accumulator with applied oxids of a single inner electrode, a metal armature for said electrode consisting of a central solid rod carrying a number of continuous plates at a distance from each other, active material completely filling up the circular spaces between said plates and a single complemental electrode arranged around and at a distance from said inner electrode, a metal armature for said complemental electrode made of a hollow cylinder carrying two or more internal continuous annular plates at a distance from each other and active material applied against said hollow cylinder between said plates.

2. The combination in an accumulator with applied oxids of a single inner electrode, a metal armature for said electrode consisting of a central solid rod carrying a number of continuous plates at a distance from each other active material completely filling up the circular spaces between said plates, a composite wall containing said active material in said spaces, said wall formed of a sheet of wood veneer covered internally by asbestos fabric and externally by a perforated sheet of metal, and a single complemental electrode arranged around and at a distance from said inner electrode, made of a hollow cylinder carrying two or more internal continuous annular plates at a distance from each other, active material applied against said hollow cylinder between said plates and a composite wall retaining said active material against said hollow cylinder formed of a sheet of wood veneer covered internally by asbestos fabric and externally by a perforated sheet of metal.

3. In a two electrode accumulator cell, an inner electrode in the form of a solid cylinder comprising a central armature with outwardly projecting plates and circular blocks of active material completely filling the spaces between said plates, and an outer electrode in the form of a hollow cylinder surrounding said solid cylinder and spaced apart therefrom, said hollow cylinder comprising a peripheral armature with inwardly projecting plates and annular blocks of active material completely filling the spaces between the latter plates, the radial dimensions of said circular and annular blocks being proportional according to the desired output.

4. In a two electrode accumulator cell, an inner electrode in the form of a solid cylinder comprising a central armature with outwardly projecting plates and circular blocks, of active material completely filling the spaces between said plates, an outer electrode in the form of a hollow cylinder surrounding said solid cylinder and spaced apart therefrom, said hollow cylinder comprising a peripheral armature with inwardly projecting plates and annular blocks of active material completely filling the spaces between the latter plates, and composite walls retaining the active material on each armature, each wall comprising a sheet of soft porous material in contact with the active material, an intermediate meet of close grained porous material and a perforated supporting sheet of rigid acid resisting material.

In testimony whereof I affix my signature in presence of two witnesses.

EMMANUEL LEMAIRE.

Witnesses:
B. W. KIRKPATRIM,
F. Y. ZABANS.